Sept. 3, 1963
J. B. HICKEY ET AL
3,102,769
RADAR DISPLAY SCOPE AUTOMATIC RECORDING SYSTEM
Filed Dec. 2, 1960
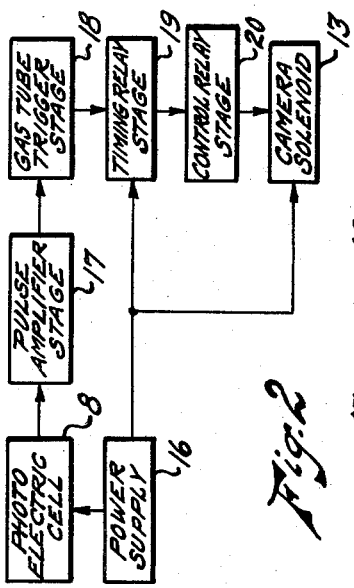
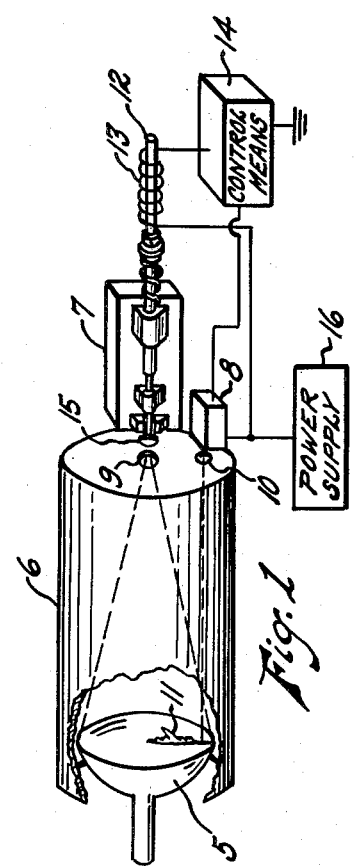
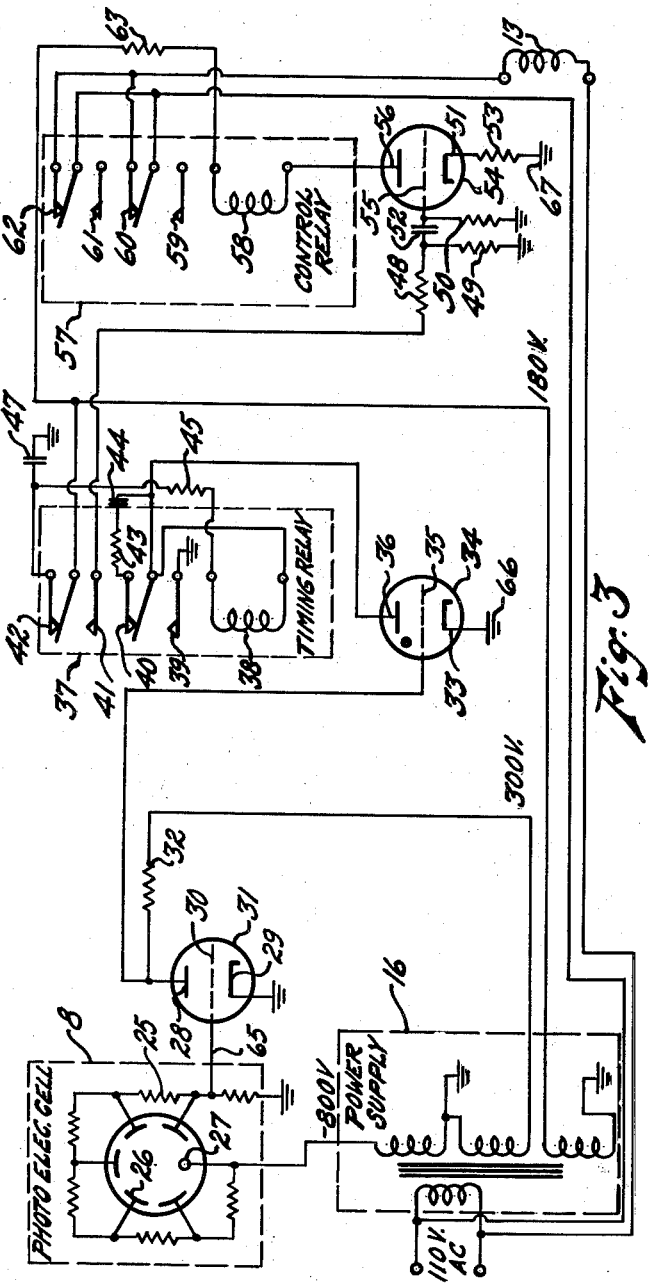
INVENTORS
JAMES B. HICKEY
AND JOHN J. MILLS
BY
Wade Keenty
Willard R. Matthews jr.
ATTORNEYS

United States Patent Office 3,102,769
Patented Sept. 3, 1963

3,102,769
RADAR DISPLAY SCOPE AUTOMATIC
RECORDING SYSTEM
James B. Hickey, Camden, and John J. Mills, Oriskany,
N.Y., assignors to the United States of America as
represented by the Secretary of the Air Force
Filed Dec. 2, 1960, Ser. No. 73,466
8 Claims. (Cl. 346—110)
(Granted under Title 35, U.S. Code (1952), sec. 266)

The invention described herein may be manufactured and used by or for the United States Government for governmental purposes without payment to us of any royalty thereon.

Our invention relates to means for photographically recording the information presented on a radar display scope and more particularly to novel apparatus designed for the purpose of automatically controlling the exposure times and frame speed of the applied photographic equipment in response to each single scan of the radar display scope being photographed.

A radar display scope presents, pictorially, information relating to the location and substance of targets within the radar range capable of reflecting an echo signal. It is oftentimes necessary to photographically record such information for subsequent review and evaluation. To obtain a comprehensive representation of moving targets a plurality of successive photographs are required. The exposure time and number of photographs necessary and hence the frame speed of the applied photographic means are determined by the speed of the particular target being examined and by the persistence factor of the display scope screen.

The use of the present invention is particularly advantageous when it is desired to record information presented by a rapidly moving target such as a jet plane which could appear only very briefly on the radar display screen. Application of conventional photographic means oftentimes results in failure to photograph such a target since the information may disappear before the picture is taken or it may appear between exposures.

It is therefore an object of our invention to provide a system for photographing a radar display scope in which a photograph of said scope is taken after each complete scan of the radar scope screen.

It is another object of our invention to provide a system for photographing a radar display scope in which the frame speed and exposure time of the photographic means are responsive to the scan frequency of the radar scope screen.

It is another object of our invention to provide a means for photographing a radar display scope comprising a novel control arrangement in combination with photographic means, said control arrangement being responsive to the radar screen scan frequency.

It is another object of our invention to provide a novel control arrangement in combination with radar scope photographic means, said control arrangement being responsive to the interception of a photoelectric cell by the radar scope base line trace.

It is a further object of our invention to provide a novel control arrangement in combination with radar scope photographic means, said control arrangement including time delay means to control the exposure time of said photographic means.

Other objects and features of the invention will become apparent and the invention will be better understood by referring to the following description taken in connection with the accompanying drawings forming a part thereof in which FIG. 1 is an isometric perspective of an arrangement of one embodiment of our invention;

FIG. 2 is a block diagram of one embodiment of our invention;

FIG. 3 is a simplified schematic diagram of one embodiment of our invention.

In the embodiment of our invention illustrated herein having reference to FIG. 1, we provide a movie camera 7 which is maintained in a fixed position relative to display scope 5. Movie camera 7 is arranged to photograph the screen of display scope 5 through aperture 9 of light shield 6. Shutter 15 is held normally open by shutter operating mechanism 12 and actuating solenoid 13.

Actuating solenoid 13 is de-energized through control means 14 thereupon closing shutter 15 in accordance with my invention as hereinafter described. Photoelectric cell 8 transmits a signal pulse to control means 14 each time base line trace 11 passes aperture 10.

FIG. 2 illustrates a block diagram of the several stages of one embodiment of our invention. Photoelectric cell 8 detects each complete scan of the radar display screen and emits a signal pulse in response thereto. The signal pulse is then amplified in pulse amplifier stage 17 and applied to the grid of a thyratron which thyratron comprises gas tube trigger stage 18. Application of the signal pulse to the grid of the gas tube causes it to conduct thereby energizing timing relay 19. Timing relay 19 activates control relay 20 which control relay 20 in turn controls camera solenoid 13, and closes the camera shutter in accordance with the scanning frequency of the display scope and the preselected exposure time as hereinafter explanied in connection with FIG. 3. Power supply 16 supplies a control power source to photoelectric cell 8 and timing relay 19 as well as control power to camera solenoid 13.

The photoelectric pick-up unit in the particular embodiment of our invention described herein consists of a photoelectric multiplier tube 8 together with its anode resistor network 25 and is illustrated schematically in FIG. 3. Power supply 16 supplies a minus 800 volt anode voltage to anode 27. Signal lead 65 connects cathode 26 to the grid 30 of pulse amplifier 31. When the radar base line trace 11 passes the aperture of photoelectric cell 8 a series of signal pulses corresponding to the sweep trace repetition rate are generated and are applied to grid 30 of pulse amplifier 31. A B+ voltage of 300 volts is applied to pulse amplifier 31 through resistor 32 by power supply 16. The pulse amplifier stage gives the system sufficient gain to obtain positive operation from a relatively dim base line trace on the radar scope. The signal pulses thus amplified are applied to grid 35 of thyratron 34. Application of a signal pulse to grid 35 fires thyratron 34 and provides a conduction path through ground point 66, cathode 33 and anode 36 of thyratron 34, closing coil 38 and normally closed contact 42 of timing relay 37 and 180 volt source from power supply 16, thereby energizing timing relay 37. Timing relay 37 establishes a self latch through capacitor 44 and resistor 43 thereby holding itself energized for a given length of time before dropping out. During this latch-up period the B+ voltage is removed from thyratron 34 since normally closed contact 40 opens when timing relay 37 is energized and the entire system is inoperative or locked out. This lock-out period prevents any extraneous light bursts, due to noise or jamming on the radar screen from retriggering the system prematurely. Each time timing relay 37 is energized a step voltage is applied to grid 55 of control tube 54 through normally open contact 41 of timing relay 37. Normally closed contact 42 removes the voltage source from the relay circuits and transfers it through normally open contact 41 to the grid circuit of control tube 54. Normally closed contact 40 transfers relay coil 38 through normally open contact 39 to a self ground connection and disconnects the trigger relay 70.

Timing relay 37 now receives its voltage from charged condenser 47 which is connected in parallel across relay coil 38 and series resistor 45. This capacitor discharges through amplifier 17 in series with relay coil 38 until the discharge current falls below the value required to hold timing relay 37 energized. At this point timing relay 37 drops out terminating the latch-up period and re-establishes the power supply voltage and triggering source.

The step voltage applied to grid 55 causes tube 54 to conduct momentarily, closing control relay 57 through the circuit comprising ground point 67, cathode 51 and anode 56 of control tube 54, closing coil 58 of control relay 57 and the 180 volt source from power supply 16. Resistor 63 limits the closing current to the desired value for relay 57. The closing of control relay 57 disconnects the power source from camera solenoid 13 by opening normally closed contacts 60 and 62.

The control relay output stage consists of control tube 54 having closing coil 58 of control relay 57 in series with its plate circuit. The supply voltage of 180 volts is applied through series resistor 63. Cathode resistor 53 supplies sufficient self bias to keep the plate current to a value well below that required to pull in control relay 57.

Energizing timing relay 37 causes a 180 volt step to appear at grid 55 of control tube 54. This voltage is divided down by resistors 48, 49 in series and is applied through capacitor 52 to grid 55. The coupling capacitor 52 in conjunction with grid resistor 50 differentiates the leading edge of the step voltage to cause a short duration positive pulse to appear at grid 55. Control tube 54 conducts during this pulse duration to energize control relay 57 for the desired fraction of a second.

Camera solenoid 13 is a 110 volt A.C. operated solenoid mechanically connected to trip lever 12 of camera 7. Solenoid 13 receives its power through normally closed contacts 60, 62 of control relay 57. In normal operation solenoid 13 holds shutter 15 of camera 7 open for the desired exposure. When control relay 57 is energized, the power to solenoid 13 is momentarily interrupted dropping the solenoid out just long enough to advance the film one frame.

It is obvious to those skilled in the art that many variations and modifications of the present invention are possible. For example the photoelectric cell as described herein could be replaced by other sensing means attached to the radar scope sweep circuit. This and various other modifications are within the scope of the following claims.

What is claimed is:
1. A system for operating the shutter of a radar display scope camera in synchronism with the radar screen trace frequency comprising illumination intensity-responsive trace frequency sensing means, shutter operating means, relay means for actuating said shutter operating means, and electronic means for energizing and de-energizing said relay means in response to said trace frequency sensing means.

2. A system according to claim 1 wherein said relay means includes time delay means for controlling exposure time.

3. A system according to claim 1 wherein said trace frequency sensing means comprises a photoelectric cell situated to intercept each excursion of the radar screen base line trace.

4. A system according to claim 3 wherein said trace frequency sensing means includes amplifier means integral with the output thereof.

5. A system according to claim 1 wherein said shutter operating means comprises a solenoid normally energized to hold the camera shutter open.

6. A system according to claim 1 wherein said relay means comprises a first relay having normally open contacts, said first relay being energized in response to said trace frequency sensing means, and a second relay having normally closed contacts, said second relay being energized through the normally open contacts of said first relay.

7. A system according to claim 6 wherein said electronic means comprises a tube having a control grid, said tube conducting a closing current for said first relay in response to application to said control grid of the output of said trace frequency sensing means.

8. A system for recording the presentation produced by each excursion of the radar trace of a radar display scope comprising photographic means including shutter operated mechanism, said photographic means being disposed in a fixed position relative to said radar display scope, illumination intensity-responsive means for producing a signal pulse responsive to each excursion of the radar trace of said radar display, a first relay means, electronic means controlling said first relay means, said electronic means including a tube having a control grid, means for applying said signal pulse to said control grid, time delay means forming part of said first relay means, a second relay means, a second electronic means controlling said second relay means, said second electronic means also including a tube having a control grid, means for applying through the instrumentality of said first relay means a bias voltage to said second named control grid and means responsive to the bias voltage thus applied for activating said shutter operating mechanism.

References Cited in the file of this patent
UNITED STATES PATENTS 2,680,148     Purington et al.     June 1, 1948
2,909,772     Thornton     Oct. 20, 1959